United States Patent [19]

Palmer et al.

[11] Patent Number: 4,551,770
[45] Date of Patent: Nov. 5, 1985

[54] VIDEO DISC ENCODING AND DECODING SYSTEM PROVIDING INTRA-FIELD TRACK ERROR CORRECTION

[75] Inventors: Richard C. Palmer, Blawenburg, N.J.; Michael A. Plotnick, Southampton, Pa.

[73] Assignee: RCA Corporation, Princeton, N.J.

[21] Appl. No.: 567,535

[22] Filed: Apr. 6, 1984

[51] Int. Cl.⁴ ............................................. H04N 5/781
[52] U.S. Cl. .................................. 358/342; 358/907; 369/43; 369/50; 369/59
[58] Field of Search ............. 360/8, 9.1, 32, 27, 360/10.1, 10.2; 369/50, 59, 43, 44, 46, 48, 111; 358/342, 336, 327, 907

[56] References Cited

U.S. PATENT DOCUMENTS

4,455,635  6/1984  Dieterich .............................. 369/59
4,488,278 12/1984  Dieterich .............................. 369/50

Primary Examiner—Donald McElheny, Jr.
Attorney, Agent, or Firm—P. J. Rasmussen; P. M. Emanuel; R. G. Coalter

[57] ABSTRACT

Video disc track numbers are conveyed during each video line by means of data subcarriers present in the recorded stereo audio channels. Upon playback, the data sequence is processed to identify tracking errors occurring within each video field to thereby enable immediate correction of disc tracking errors on a line-by-line basis thus minimizing picture and sound interruption caused by intra-field tracking errors.

3 Claims, 10 Drawing Figures

|  | FSK-1 | | FSK-2 | |  |
|---|---|---|---|---|---|
| LINE | MSB / IDENT | LSB | | | |
| N | 1 | B5 | B4 | B3 | } PAIR N |
| N+1 | 0 | B2 | B1 | Bφ | |
| N+2 | 1 | B5 | B4 | B3 | } PAIR N+1 |
| N+3 | 0 | B2 | B1 | Bφ | |

*Fig. 6A*

| N | 1 | B8 | B7 | B6 | } TRIAD N |
|---|---|---|---|---|---|
| N+1 | 0 | B5 | B4 | B3 | |
| N+2 | 0 | B2 | B1 | Bφ | |
| N+3 | 1 | B8 | B7 | B6 | } TRIAD N+1 |
| N+4 | 0 | B5 | B4 | B3 | |
| N+5 | 0 | B2 | B1 | B0 | |

VIDEO DISC ENCODING AND DECODING SYSTEM PROVIDING INTRA-FIELD TRACK ERROR CORRECTION

FIELD OF THE INVENTION

This invention relates to video disc systems and particularly to systems wherein field identification numbers are recorded in the vertical blanking interval and recovered upon playback of the disc to facilitate track error correction.

BACKGROUND OF THE INVENTION

Video disc players have inherent advantages in playing back video programs as compared with video tape players, e.g., the ability to quickly access the recorded information, relatively low replication costs, relatively simple mechanical requirements, etc. This, unfortunately, is accompanied by a basic disadvantage relating to tracking errors. Specifically, a forward or backward skip of one track on a helical scan VTR results in only a one field error in the location of the pick-up transducer. A single skip of one track convolution in a presently available video disc player (e.g., the RCA model SJT-100) results in an eight field error in the recovered signal. In another known player a skip of one track results in a two field error for disks recorded at a constant angular velocity.

It is known that one may correct tracking errors in a video disc player on a field-by-field basis thereby placing video disc payers on a par with video tape players. As an example, in U.S. Pat. No. 4,313,134 of Rustman et al., a video disc system is disclosed wherein field numbers are recorded in pulse code modulation (PCM) form during the vertical interval of each video field. This has become known as a digital auxiliary information code (hereinafter DAXI code). Tracking errors (e.g., locked or skipped grooves or information tracks) are detected in a player by noting an improper sequence of two or more decoded DAXI field numbers. Correction of the error is provided by means of a transducer deflector (e.g., a stylus "kicker" solenoid or piezoelectric element) which radially translates the pick-up transducer in a direction to reduce the tracking error until such time as the field numbers again form an orderly sequence. Other patents relating to the DAXI code, its generation, recovery and use in video disc player include U.S. pat. No. 4,308,557 of C. B. Dieterich, U.S. Pat. No. 4,307,418 of Mindel et al. and U.S. Pat. 4,309,721 of Christopher.

Heretofore it has been recognized that a need exists for correction of tracking errors in video disc systems on a more frequency basis than the field-by-field (inter-field) basis provided in known video disc systems. Such a system is described by C. B. Dieterich in his U.S. Patent Application Ser. No. 556,444 filed Nov. 30, 1983, entitled "VIDEO DISC ENCODING AND DECODING SYSTEM PROVIDING INTRA-FIELD TRACK ERROR CORRECTION".

In the Dieterich system, a method for forming a video disc recording signal, for facilitating intra-field track error correction, comprises providing a video signal and a data sequence representative of field numbers. The video signal, the data sequence and a subset of the data sequence are processed to form a recording signal with the subset data sequence conveying partial tracking information on a line-by-line or plural line basis within each field. In a specific example of the Dieterich encoding system, the "partial" tracking data is conveyed by means of quadrature phase shift keying (QPST) of a subcarrier with local groove number (LGN) data and adding the QPSK signal to the mastering signal during a portion of the horizontal blanking interval for subsequent recovery in a video disc player. The player includes means for comparing a current track number (from the recovered subsets) with the anticipated track number (from the corresponding portion of the full field number) to develop an error signal for radially translating the player pickup transducer in a sense to correct tracking errors when the numbers differ.

SUMMARY OF THE INVENTION

It is an advantage of the Dieterich system that the LGN data, being sent during a portion of the horizontal blanking interval, has little likelihood of interfering with the "active video" or displayed portion of the video signal when the disc is played back and viewed on a television receiver. However, the bandwidth requirements are relatively high due to the limited transmission time available.

It is an object of the present invention to provide improvements in systems of the general kind described to increase both the data transfer rate and the data detection reliability while, at the same time, reducing the system bandwidth requirements.

In accordance with the invention, a method for forming a video disc recording signal for facilitating intra-field track error correction upon subsequent playback of video disc records recorded with said disc recording signal comprises providing first and second baseband sound signals, a baseband video signal and a data sequence representative of field numbers of said video signal. A subset of the data sequence representative of track identification numbers is provided and encoded on first and second frequency shift keyed carrier waves. The first baseband sound signal is combined with the first carrier wave to form a first resultant signal, and the second baseband sound signal is combined with the second carrier wave to form a second resultant signal. The baseband video signal and the two resultant signals are applied to respective frequency modulators having outputs summed to provide the video disc recording signal.

A video disc player, embodying the invention, for use with disc records encoded as described, includes a first means for recovering said data sequence and a pair of FM demodulators for recovering the subset of the data sequence from the two resultant signals. A pair of detectors coupled to the demodulator outputs detects the subset data and supplies it to a register for storage. A data processing means compares the subset of the field numbers with the data sequence to develop a tracking error control signal which, in turn, is applied to the first means in a sense to reduce tracking errors occurring within a field.

DETAILED DESCRIPTION

Figure 1:
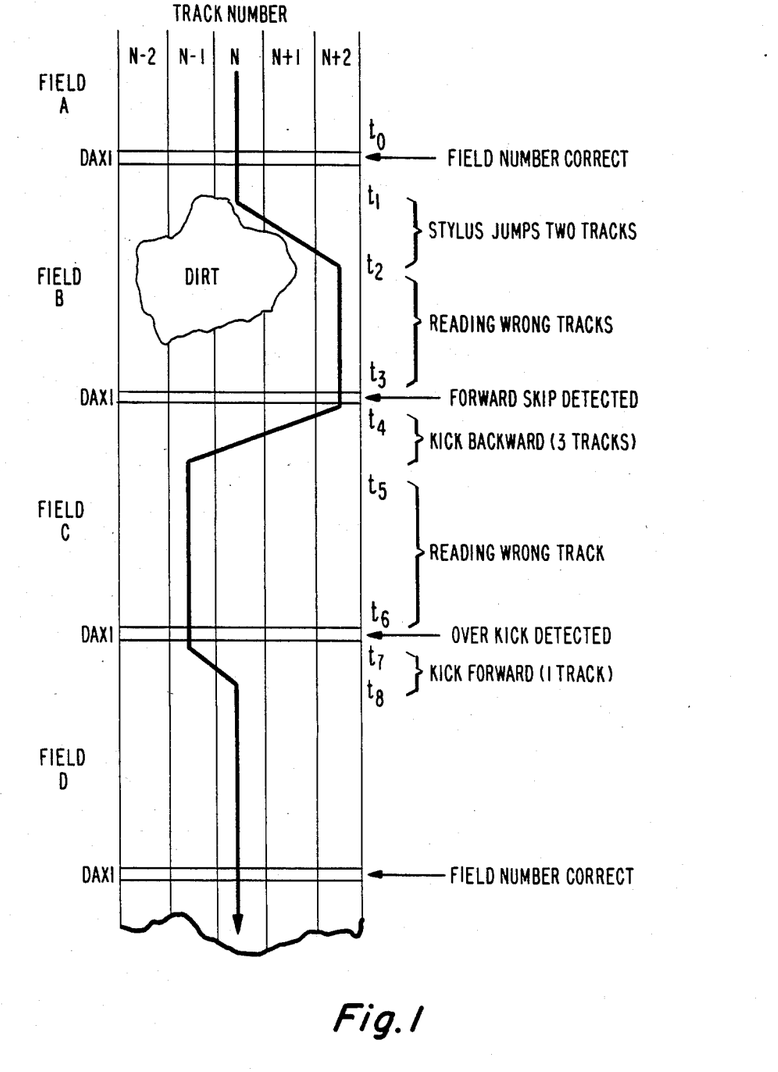
FIGS. 1 and 2 are plan views of a portion of a video disc record showing the locus of travel of a pick-up stylus in a disc player having field-by-field (inter-field) track error correction (FIG. 1) and line related track error correction in accordance with the invention (FIG. 2)
Figure 2:
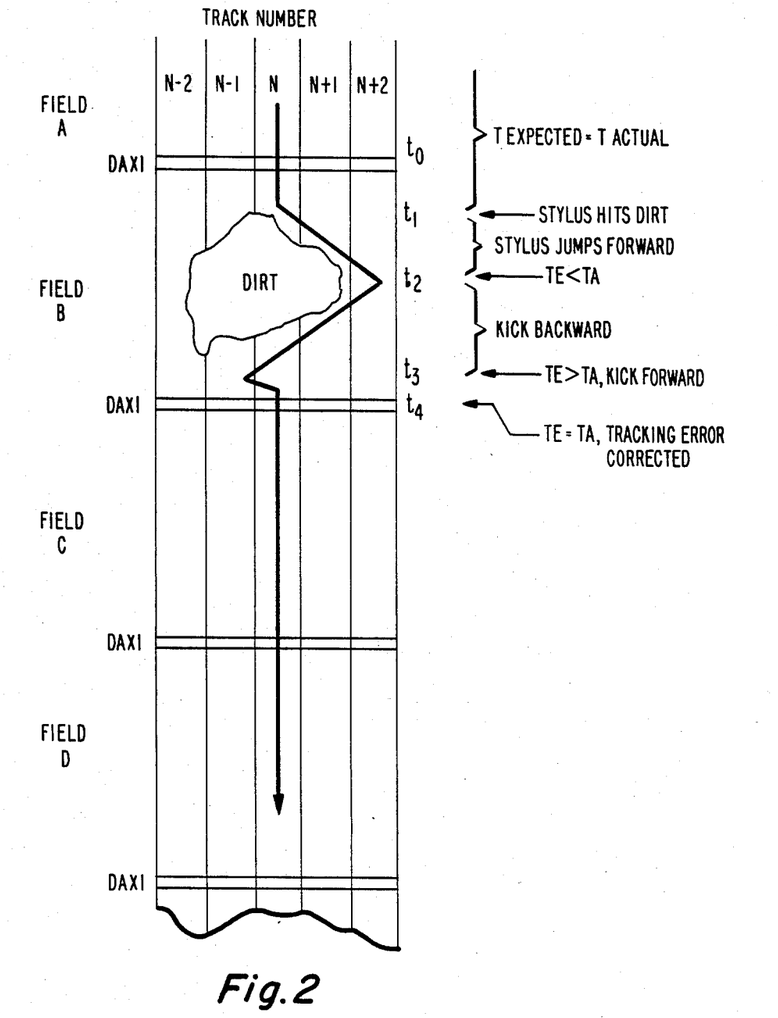

FIGS. 1 and 2 provide a comparison of a field-by-field track error correction method (FIG. 1) with the line-by-line correction method (FIG. 2). In FIG. 1, five adjacent tracks of a disc record are shown along with the locus (path) of travel (dark arrow) of a signal recovery stylus. The term "track", as used herein, means an information conveying path on a disc and may be formed in a spiral or in concentric circles. The stylus is initially in track number N of field A at time t-0 and is lofted from the disc at time $t-1$ upon encountering a particle of dirt spanning tracks $N-2$, $N-1$ and N. AT time $t-2$ the stylus lands in track number $N+2$ and continues in that track until the beginning of the next field (field C). Since the stylus has been radially translated by two tracks, the true tracking error amounts to a total skip of sixteen fields in a disc system where there are eight fields per disc convolution.

To correct the tracking error, the DAXI field number code recovered in the vertical interval of field B is compared with the code for field C which is recoverd at time $t-3$. A kick pulse is applied to the stylus at time $t-4$ which, for illustrative purposes, results in an overkick in the interval $t-4$ to $t-5$ to track number $N-1$. The overkick is corrected in a similar fashion in field D until the stylus is again tracking the correct track N.

As seen, in this hypothetical example, the total time lost during track error correction amounts to about two fields. Even if the overkick had not occurred in field C, the disruption in the video signal would amount to about one field which would be visible in the displayed video image and audible in the reproduced sound. It is desirable to reduce the duration of the disruptions and thus increase the "fidelity" of the recovered image.

FIG. 2 illustrates the improvement which may be obtained when track error correction is provided on a line-by-line basis in accordance with the invention using information specially encoded on the player sound carriers. As shown, the two corrections for traversing the dirt particle are accomplished well within the time frame of one field. For purposes of illustration, the size of the dirt particle is greatly exaggerated. In practice most disc defects are quite small relative to the physical dimension (length) of one field and so corrections may be made within a few lines. It should be noted from FIG. 1, however, that even a small defect in a disc with field-by-field track error correction can nevertheless result in a track error approaching one entire field or more in length.

Figure 3:
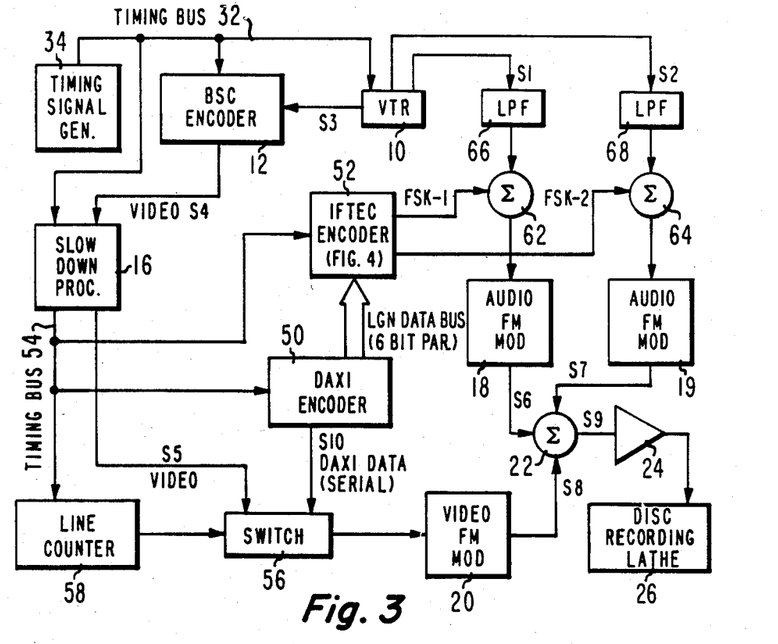
FIG. 3 is a block diagram of a video disc recording system embodying the invention.

The video disc mastering system of FIG. 3 includes a video tape recorder 10 for providing a source of audio signals S1 and S2 and video signal S3 to be recorded. Recorder 10 is preferably a slow motion recorder provided with automatic scan tracking (AST) to facilitate mastering at half rate (one half normal playback speed) using the skip field mastering technique described in detial in U.S. Pat. No. 4,277,796 of M. Ross entitled "SLOW DOWN COLOR PROCESSOR FOR VIDEO DISC MASTERING USING A SPECIAL MODE VTR". The video signal S3 is applied to a buried subcarrier (BSC) encoder 12, which, preferably, is of the type described in U.S. Pat. No. 3,872,498 of Pritchard. In the BSC format used in FIG. 3, chrominance information is represented by a color subcarrier of the general form employed in the well known NTSC format which is buried in a lower portion of the video band rather than being located in the high end of the luminance signal band. An illustrative subcarrier frequency choice is in the vicinity of 1.53 MHz with the color subcarrier sidebands extending plus or minus 500 KHz thereabout and with the luminance signal band extending well above the highest color subcarrier frequency (to 3 MHz, for example).

The BSC encoded video signal S4 is applied to a video slow down processor 16 which preferably is of the type described in the Ross patent. Briefly, in the Ross system selected fields of the redundant field (slow motion) video signal S4 are stored in a memory in processor 16 at a standard clock rate and recovered at a lower clock rate that is inversely proportional to the number of times each field is repeated so as to produce a non-redundant video output signal (S5 here) of reduced bandwidth. The bandwidth of the audio signals S1 and S2 are reduced by the same factor as the video signal (one half) during operation of recorder 10 in the slow motion mode. The audio signals S1 and S2 and the processed video signal S5 are applied to respective frequency modulators 18, 19 and 20 and the resultant frequency moduated signals S6, S7 and S8, respectively, are combined in a summing circuit 22 to form a resultant composite recording signal S9 processing the full information content of the original audio and video signals. The recording signal S9 is applied via an amplifier/equalizer 24 to the cutterhead of a recording lathe 26. The turntable of lathe 26 is rotated by a drive motor (not shown) which receives half-rate drive signals produced by processor 16 whereby full bandwidth master recordings may be made with a cutterhead of lesser bandwidth.

Synchronization of recorder 10, encoder 12, and processor 16 is provided by means of a timing bus 32 supplied with timing signals (e.g., vertical, horizontal, color subcarrier, etc.) produced by a timing signal generator 34. A generator suitable for producing NTSC format standard video timing signals is the Tektronics Model 146 NTSC Test Signal Generator. (For mastering in other format such as PAL or SECAM an appropriate generator should be used).

The remaining elements of the mastering sytsem encode digital data for recording along with the audio signals on lathe 26. Two data encoders are provided, namely, a DAXI data encoder 50 and an intra-field track error correction encoder (IFTEC) 52. The encoders receive "half rate" timing signals from a bus 54 from slow down processor 16. The "half rate" timing signals include horizontal blanking pulses (HB/2), vertical field pulses (FV/2), horizontal sync pulses (HS/2) and the buried subcarrier reference frequency (FBSC/2). DAXI data encoder 50, illustratively, is of the type described in the aforementioned patent of Dieterich and the other patents relating to DAXI coding and provides video field and band numbers and other suitable information relating to the video signal produced by recorder 10 (e.g., bits may be assigned to identify monophonic or stereophonic or bilingual material, etc.). As an illustration, field identification numbers may be produced by encoder 50 by counting vertical field pulses provided via bus 54 from processor 16.

The DAXI data signal S10 is inserted in place of the video signal S5 on lines 17 and 280 of each frame by means of a multiplex switch 56 interposed between processor 16 and video FM generator (modulator) 20. Switch 56 is controlled by a line counter/decoder 58 coupled to bus 54. Normally, switch 56 couples the video signal S5 to FM generator 20 but changes over to couple the DAXI signal S10 when the line counter count is 17 or 280. The DAXI signal comprises a 77 bit PCM word synchronized with the buried color subcarrier frequency (about 1.53 MHz at full rate, 1.53 MHz/2 for half rate mastering) to facilitate subsequent detection in a video disc player. Each DAXI word comprises a 13 bit start code (a Barker sequence for dtaa framing) followed by a 13 bit CRC (cyclic redundancy check) error check code and ending with a 51 bit information code. Of the 51 bits in the information code, 6 provide a record band number, 18 provide a video field identification number (each field on a disc side is uniquely identified) and the remaining 27 are currently unassigned but are included to provide information capacity for future expansion or other uses of the DAXI code.

The IFTEC encoder 52 receives timing signals (at half rate for half rate mastering) from bus 54 and 6 bits (parallel) of the 18 bit field identification number from DAXI encoder 52 and supplies two frequency shift keyed signals (FSK-1 and FSK-2) representing local "groove" (or "track") numbers (LGN data) to a pair of summing circuits 62 and 64 interposed between the outputs of two low pass filters 66 and 68 (in the audio signal path) and the inputs of audio frequency modulators 18 and 19.

The purpose of filters 66 and 68 is to insure that the highest baseband audio frequency is below the FSK signaling frequency. Illustratively, filters 66 and 68 have cut-off or corner frequencies of about 10 KHz for half rate recording which corresponds to an audio bandwidth of 20 KHz upon playback of the disc. The FSK signals may have a center frequency of 47.5 KHz and a deviation of 7.5 KHz (real time, half that in this half rate recording system). The carrier frequencies of modulators 18 and 19 are selected to be interlaced at frequencies of 91 fH/2 and 115 fH/2, respectively. Upon playback this corresponds to sound carrier frequencies of about 716 and 905 KHz, respectively, which are compatible with all existing video disc players (e.g., SJT-400 etc.) manufactured, for example, by RCA Corporation.

The 6 bits selected from the 18 bit field identification number are a particular subset providing identification of 64 least significant "track" or "groove" numbers. A complete track number comprises all bits of the 18 bit field number except the 3 least significant bits (LSBs). The LSBs, in the "capacitance electronic disc" (CED) system uniquely identify the 8 field sectors of the disc. Since it is track convolutions and not sector identification which is of importance to the present invention, the 6 bit subset of the 18 bit field number corresponds to bits 4, 5, 6, 7, 8 and 9 (where the LSB is bit 1 and the MSB is bit 9). This provides identification within a field of stylus skips forward or backward of 32 grooves. Most tracking errors are much less than skips of 32 grooves, a one groove skip being most common.

To correct for intra-field tracking errors in a video disc player, the LGN data is recovered, as will be described, and compared with the corresponding 6 bits conveyed by the DAXI code. If the LGN and DAXI groove (track) numbers are the same, then no error has occurred and no corrective action is needed. Conversely, if the LGN and DAXI numbers differ, then an interrupt signal is sent to the player tracking control microprocessor along with the "difference" number and the player microprocessor supplies "kick" pulses to the pick-up transducer in a sense to reduce the tracking error until the DAXI and LGN numbers agree and the interrupt signal is terminated.

Figure 4:
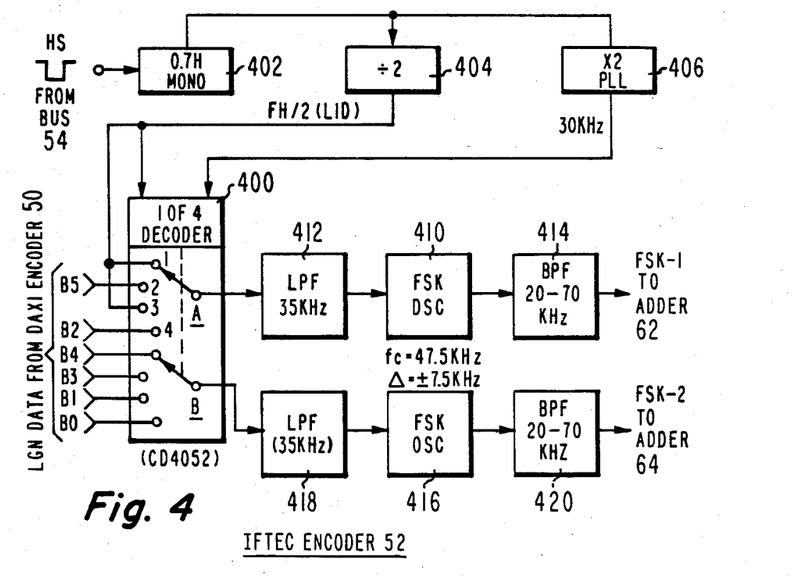
FIG. 4 is a detailed block diagram of an intra-field track error correction (IFTEC) encoder suitable for use in the system of FIG. 3.

FIG. 4 is a detailed embodiment of a preferred implementation of IFTEC encoder 52. The encoder includes a 2 channel 4 position multiplex switch 400 (e.g., a type CD-4052 integrated circuit) having inputs connected to receive the six LGN data bits B0-B5 from the DAXI encoder 50. Three of the six bits along with a "line identification" (LID) bit are sent during each horizontal line. The purpose of the LID bit is to make the system completely "self contained" in the sense that the first bit of FSK-1 signal in a given line identifies whether the data in that line is the three MSB's or the three LSB's of the LGN data.

In more detail, the control or selection code for switch 400 and the LID data is produced by a monostable multivibrator 402 which receives horizontal sync pulses HS from bus 54 and supplies HS rate pulses to a divide by two counter 404 and to a multiplying phase locked loop 406. Mono 402 has a quasi-stable period of 0.7 H to remove the equalizing pulses from the composite sync signal which occur during the first nine lines of the vertical interval. The output of the counter 404 is at half line rate, it changes state every other line, and is the LID signal. The output of the X2 PLL and the LID signal are applied to the decoder inputs of switch 400, thereby stepping switch 400 through its four states every two lines.

In position "1" section "A" of switch 400 couples the LID signal to FSK oscillator 410 via a low pass filter 412. The output of oscillator 410 is coupled via bandpass filter 414 to supply signal FSK-1 to adder 62 (FIG. 3). Simultaneously, section "B" couples bit 4 of the LGN data to oscillator 416 via low pass filter 418 and bandpass filter 420 couples the output (FSK-2) to adder 64 (FIG. 3). Suitable frequencies for these elements, in terms of real time recording are 35KHz for filters 412 and 418, 20–70 KHz for filters 414 and 420, and a center frequency of 47.5 KHz and a deviation of plus or minus 7.5 KHz for oscillators 410 and 416. All these numbers should be divided by two when he IFTEC encoder is used in a half rate recording system as in FIG. 3.

Figure 5:
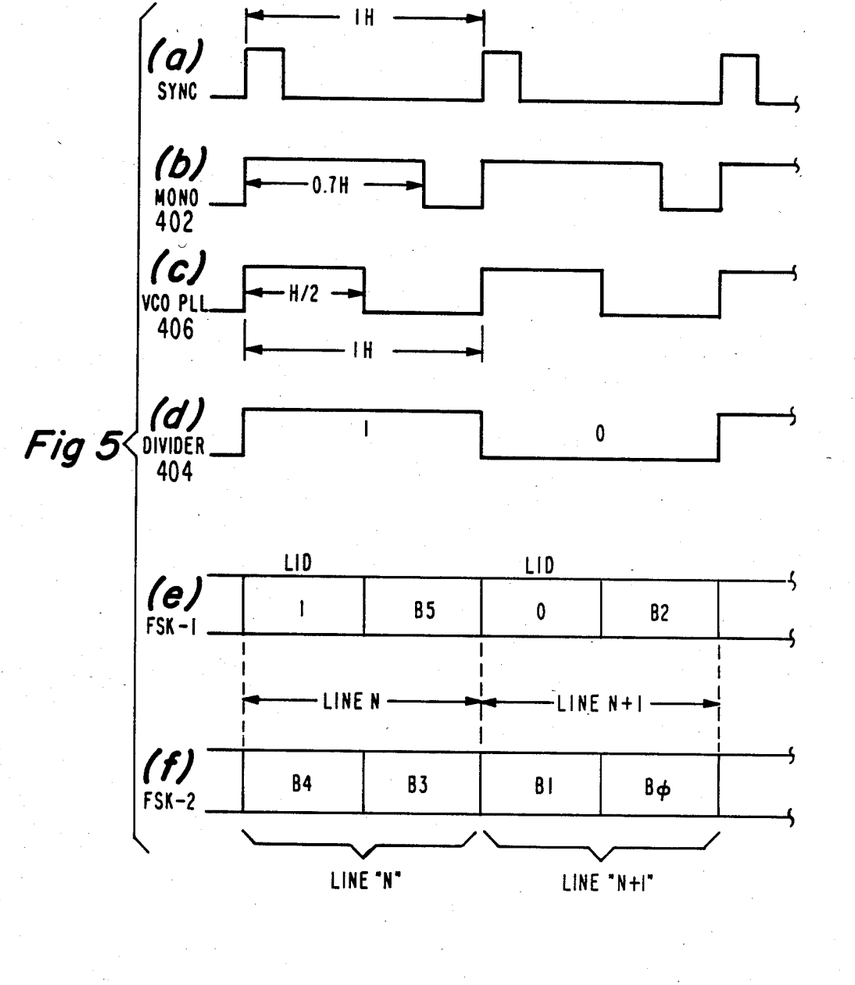
FIG. 5 is a waveform diagram illustrating operation of the system of FIG. 3.

FIG. 5 provides a detailed view of the waveforms and timing relationships of the encoder of FIG. 4. Two line intervals are shown (line "N" and the next line "N+1"). As shown, the sync signal (a) triggers mono 402 which, having a period of 0.7 H eliminates the vertical interval equalizing pulses. PLL 406 and divider 404 produce 2 H and H/2 outputs, respectively. In two lines the four possible combinations of signals "C" and "d" are decoded in switch 400 which then selects the LID and LGN data as shown for the two FSK transmission channels FSK-1 and FSK-2. (FIGS. 5e and f, respectively).

Figure 6A:
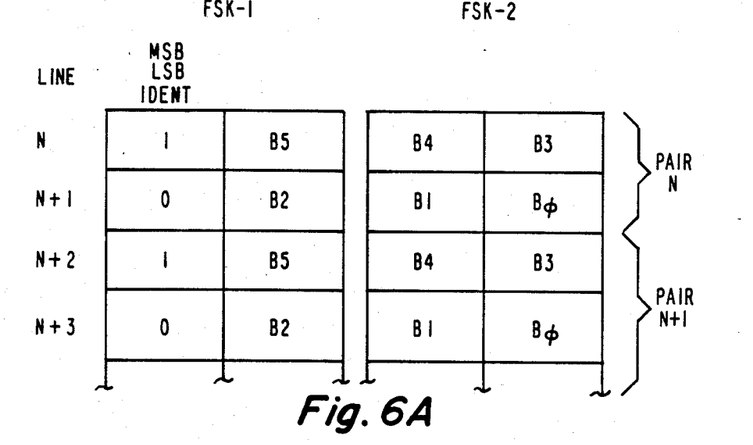
FIGS. 6A and 6B are diagrams illustrating data sequencing in the system of FIG. 3.
Figure 6B:
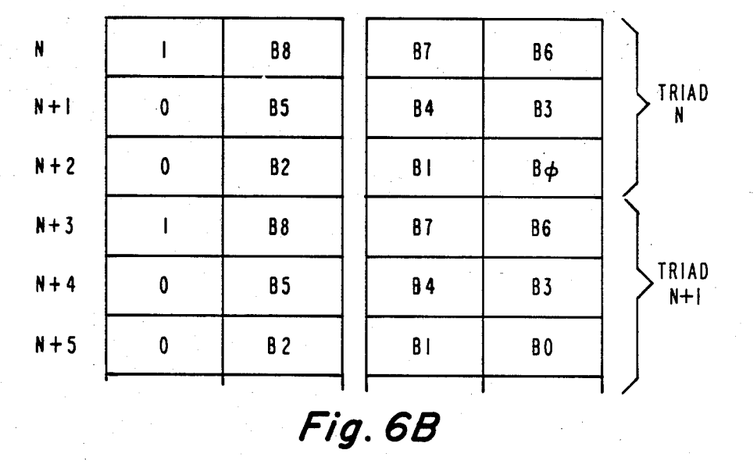

FIG. 6A provides the same data as "e" and "f" of FIG. 5 but presented in a vertical format. FIG. 6b illustrates extension of the FIG. 6a format to convey 9 bits of data per triad of lines rather than 6 bits of LGN data per pair of lines. In this case, as in the 6 bit case, the first signaling interval of FSK-1 (the first half line) always conveys the line identification bit ("1") which identifies the MSB of the LGN data.

Figure 7:
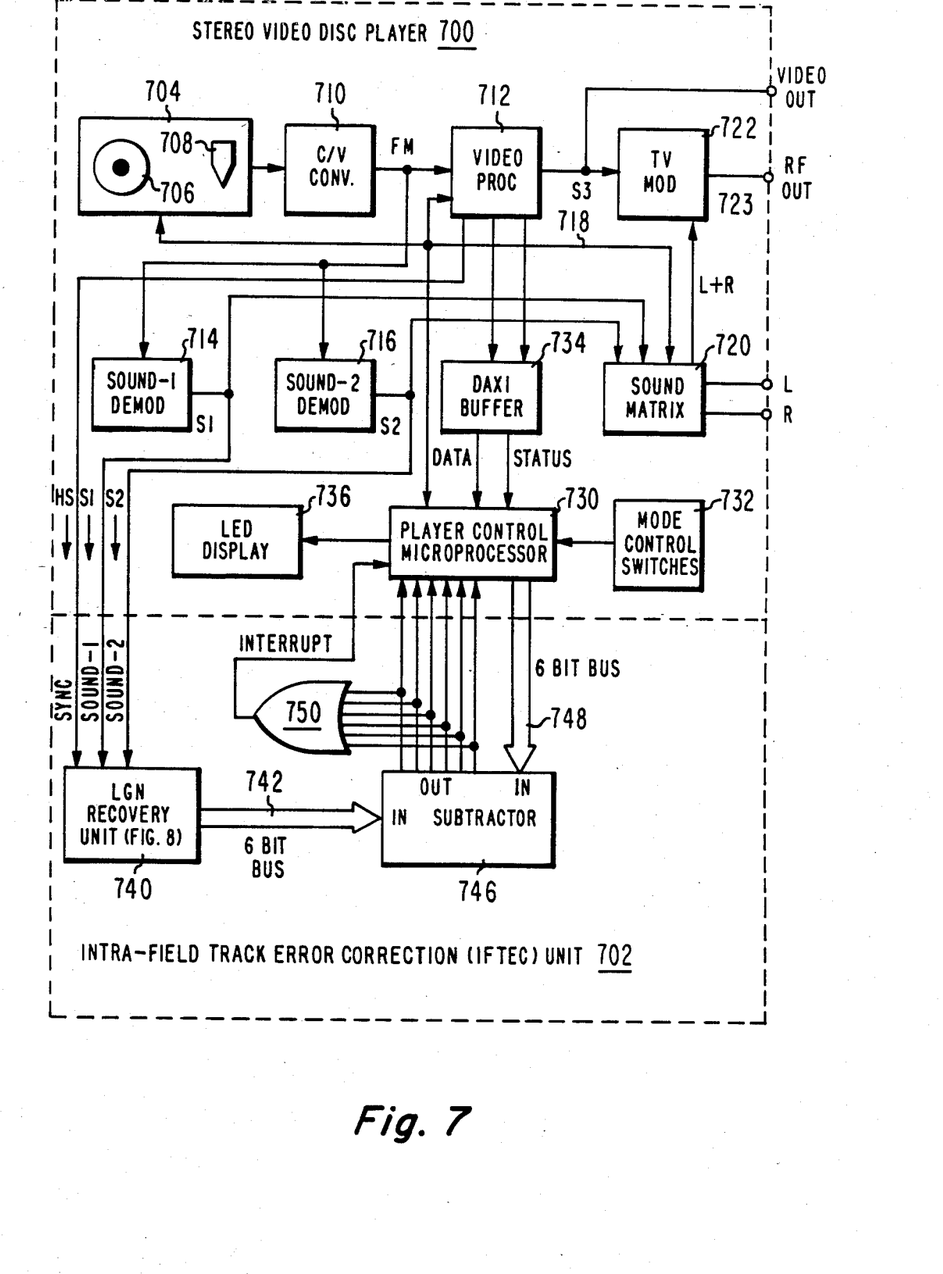
FIG. 7 is a block diagram of a videodisc player embodying the invention.

FIG. 7 is exemplary of a stereophonic video disc layer 700 (outlined in phantom) modified by the addition of an intra-field track error correction (IFTEC) processor 702 (also outlined in phantom) to provide the line-by-line track error correction feature of the invention when playing back video disc records mastered as previously described. The player 700 may be of conventional design such as the model SJT-400 CED video disc player manufactured by RCA Corporation. The principles of the invention, of course, may readily be applied to any form of video disc player wherein field or tracking information is conveyed during the vertical interval of a field by a coding system such as the DAXI system or some other suitable system. Of importance to an aspect of the present invention is that there be some form of "primary" coding system for conveying tracking information on a field-by-field basis or at least a frame-by-frame basis and a "secondary" coding system for conveying a subset of the primary tracking information on a line basis. In the present system, the intra-field tracking information is conveyed on a two line basis, that is, the tracking information is available every two lines throughout each field as shown in FIGS. 5 and 6a.

Player 700 includes a turntable mechanism 704 for rotating a video disc record 706 and a pickup transducer 708 for recovering information signal from the disc. In the CED system, the information is stored in the form of topological variations of a spiral information track and recovered by sensing capacitance variations between a stylus in transducer 708 and disc 706. The sensed variations are applied to a capacitance-to-voltage (C/V) converter 710 which produces an FM output signal representative of the recorded information. Such records and suitable circuits for implementing the C/V conversion are well known. See for example, U.S. Pat. No. 3,783,196 (Stanley), No. 3,842,194 (Clemens) and No. 4,080,625 (Kawamoto et al.).

The FM signal is applied to a pair of sound demodulators 714 and 716 which produce baseband audio output signals S1 and S2. The FM signal is also applied to a video processor 712 which produces a baseband composite video output signal S3. Processor 712 has an input connected to a player control bus 718 for receiving squelch signals for muting the video signal under certain player operating conditions (e.g., "pause"). Bus 718 also conveys turntable motor and tracking control signals to mechanism 704. Pyles et al., in U.S. Pat. No. 4,286,290 entitled "FAST RECOVERY SQUELCH CIRCUIT FOR A VIDEO DISC PLAYER" which issued Aug. 25, 1981, discloses a suitable implementation of processor 712 which provides timebase error correction circuitry and format conversion circuitry for converting the recovered video signal from the buried subcarrier" format proposed by Pritchard in U.S. Pat. No. 3,872,498 to the NTSC format. Carnt et al., in U.S. Pat. No. 4,200,881 describe processors suitable for recording and reproducing composite video signals of PAL format.

The baseband audio signals S1 and S2 are applied to a stereo matrix 720 which provides left (L) and right (R) output signals and a sum signal L+R. The L+R signal and the video signal produced by processor 712 are applied to the sound and picture carrier modulation inputs of a TV modulator 722 which has an RF output terminal 718 for connection to the antenna input terminal of a conventional television receiver for displaying sound and picture information recovered from disc 706. An integrated circuit suitable for use as modulator 722 is the type LM 1889 available, for example, for National Semiconductor, Inc.

A player control microprocessor 730 provides various supervisory and information display control functions. The control functions (supplied via bus 718) include, illustratively, "stylus kicking" and control of the radial position, elevation, velocity and direction of movement of pick-up transducer 708 relative to disc 706 and squelching of the audio and video signals. Some of the functions are initiated manually by means of a player control switch unit 732 coupled to an input port of microprocessor 730. Manually initiated functions include, illustratively, play, pause, slow scan forward or reverse, etc. Upon closure of one of the user activated switches in unit 732, microprocessor 730 addresses its internal read only memory (ROM) and fetches an appropriate sequence of instructions resident in the memory for effecting the desired control function.

DAXI information (e.g., field numbers, band numbers, etc.) is conveyed to microprocessor 730 be means of a DAXI BUFFER integrated circuit 734 having inputs coupled to receive PCM data and a 1.53 MHz clock signals (FBSC) from processor 712 and having outputs coupled to supply data and a data status flag signal to input ports of microprocessor 730. When a DAXI code word is received without error, the status flag is SET and microprocessor 730 processes the data for machine control purposes (e.g., detecting stop flags or end of record bits) and player display purposes (e.g., calculation of elapsed playing time from the 18 bit field number data which is displayed on an LED display 736). Buffer 734 and microprocessor 730 are commercially available integrated circuits and are described in more detail in the previously mentioned DAXI related U.S. Patents.

Buffer 734 is interfaced with a comb filter (not shown) in processor 712 for detecting the PCM DAXI data as described in C. B. Dieterich's U.S. Pat. No. 4,275,416 entitled "PCM DETECTOR" which issued June 23, 1981. For the purposes of the present invention, only four types of signals are needed from video disc player 800 for use in the IFTEC processor 802. They are: the player sound demodulator output signals S1 and S2, a horizontal sync (HS) output signal provided by a sync detector (not shown) in processor 712 and 6 bits of the DAXI field number data provided by the player control microprocessor 730 (alternatively, the field number data may be taken directly from the DAXI buffer 734).

Figure 8:
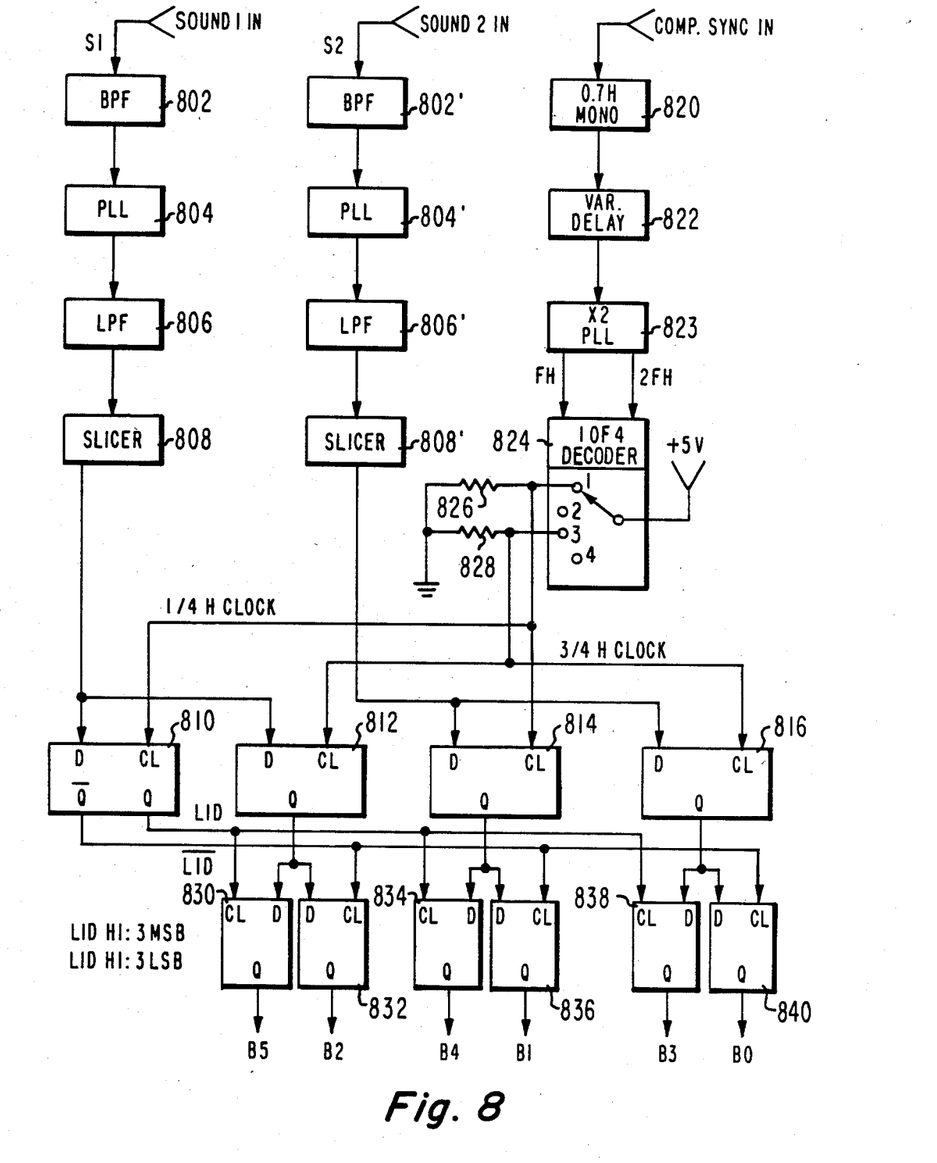
FIG. 8 is a block and circuit diagram of a LGN (local groove number) recovery unit suitable for use in the player of FIG. 7.

Signals HS, S1 and S2 are applied to a local groove number (LGN) recovery unit 740 in IFTEC until 702 which recovers the 6 bit subset of the DAXI field number conveyed by FSK modulation of signals S1 and S2. A suitable implementation of unit 740 is shown in FIG. 8. As the LGN data is received (every two lines) it is supplied via a six bit (parallel) data bus 742 to one input of a subtractor 746 which receives the corresponding 6 bits of the DAXI field number via another bus 748 from microprocessor 730. If no tracking error has occurred, the LGN data recovered from the IFTEC processor 802 should be exactly the same as the corresponding data recovered by the DAXI system in the player. If so, the result of the subtraction of the LGN data bits from the DAXI data bits will be zero, indicating that no tracking error has occurred.

Zero is tested by means of an OR gate 750 coupled to the output of subtractor 746. If a tracking error has occurred, however, one or more of the subtractor outputs will be non-zero and gate 750 will be enabled to supply an interrupt signal to an interrupt input of microprocessor 730. Simultaneously, the data at the subtractor output (which represents the magnitude and sense of the tracking error) is applied to data input ports of the microprocessor. In response to the tracking error interrupt signal, microprocessor 730 enters an interrupt service routine and begins sending "kick" pulses to transducer 708 via control bus 718 to radially translate the signal recovery stylus of the transducer in a sense and by the indicated number of track convolutions to reduce the tracking error. The interrupt service routine in microprocessor 820 may comprise, illustratively, a jump instruction to the exisiting track error correction routine already resident in the microprocessor for servicing DAXI detected tracking errors. Alternative processing of the LGN data recovered from the player sound carrier is discussed subsequently in connection with FIG. 9.

FIG. 8 provides a detailed blcok diagram of LGN recovery unit 740. The sound signal S1 is applied to a bandpass filter 802 (e.g., 20–70 KHz) and the FSK-1 component is demodulated by a PLL 804, low pass filtered 806 (e.g., 25 KHz) and applied to a slicer 808 which supplies a binary valued data signal to the D(data) inputs of a pair of D-type flip flops 810 and 812. The S2 signal is similary processed in filter 802', PLL 804', LPF 806' and slicer 808' and applied to the data inputs of flip flops 814 and 816.

The data conveyed by FSK-1 and FSK-2 are stored during each line in flip flops 810–816 by clocking flip flops 810 and 814 during the first quarter of a line (¼ H clock) thereby sampling the data in the middle of each data interval (FIG. 5) and clocking flip flops 812 and 816 during the third quarter of each line (¾ H clock) (see FIG. 5(e) and 5(f)). These clock signals are obtained by applying the composite sync signal (from processor 712) to a 0.7 H monostable 820 which removes the equalizing pulses present during the vertical interval. The HS rate output of mono 820 is phase adjusted via a variable delay unit 822 (to account for delays in the data due to filtering) and multiplied by two in a multiplying PLL 822. The loop provides FH and 2 FH outputs which are decoded by a multiplex switch 84 having a wiper coupled to a source of supply voltage (5 volts) and contacts 1 and 3 coupled to ground via respective "pull down" resistors 826 and 828. The voltage developed across resistor 826 clocks flip flops 810 and 814 at ¼ of a line and that produced by resistor 828 provides clocking of flip flops 812 and 816 at ¾ of one line.

The contents of flip flop 810 is the LID data which identifies the sequence of all associated LGN data as shown in FIGS. 5(e) and 5(f) and is used to transfer the data of flip flops 812–816 to three pairs of flip flops 830–840. After two lines are received, flip flops 830–840 contain the complete 6 bit local groove number which is then processed by subtractor 746, gate 750 and microprocessor 730 as previously described.

Figure 9:
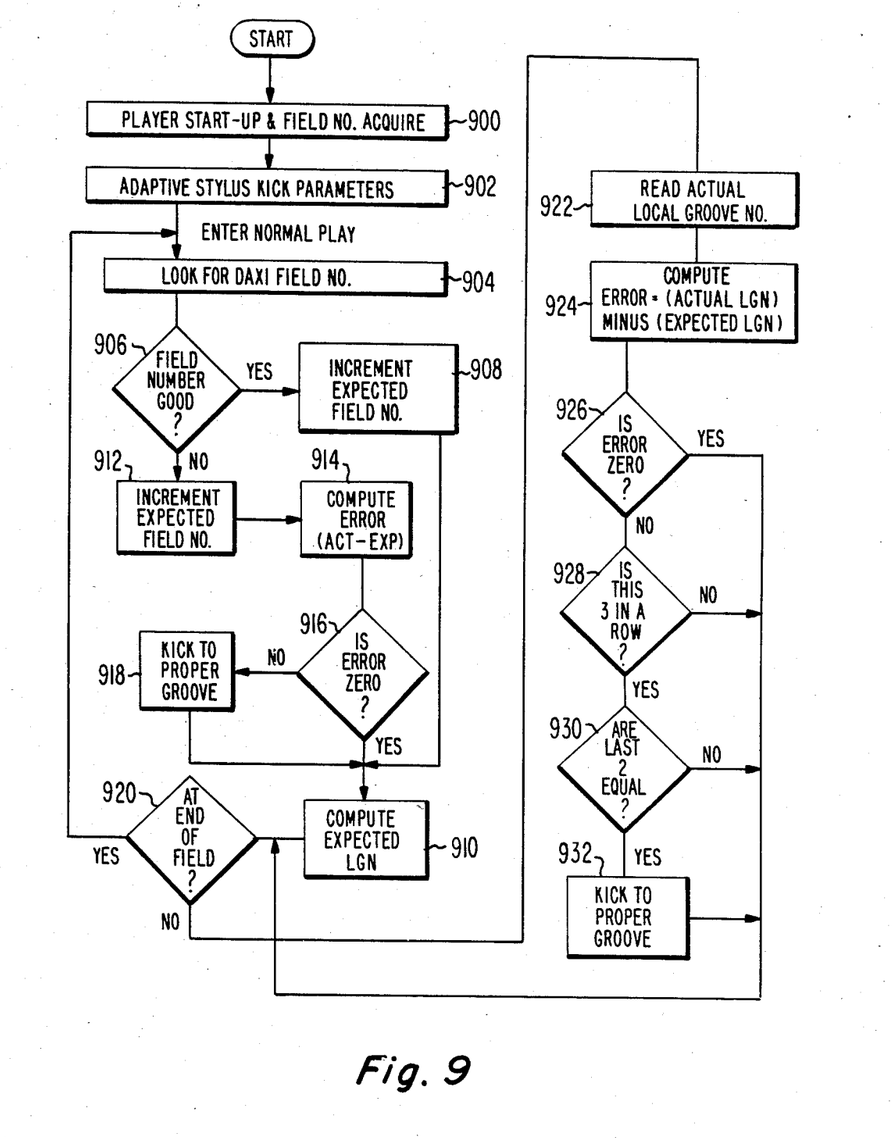
FIG. 9 is a program flow chart suitable for use with the player control microprocessor of FIG. 7.

In order to improve the validity or "integrity" of the local "groove" or track numbers recovered from the player sound carriers, microprocessor 730 may be reprogrammed as indicated in the flow chart of FIG. 9 rather than use the interrupt routine previously described. The program begins with a conventional start-up routine (boxes 900, 902) described in the previously mentioned DAXI patents which include a detailed machine state diagram.

When the player enters the "enter normal play" state the first subroutine step is to "look for DAXI field number" which, in the player of FIG. 7 comprises simply monitoring the DAXI status flag produced by buffer 734. In the well known DAXI system, all fields are numbered in sequence. The next stage of the program is to verify the sequence since it is possible to receive a valid DAXI code but, due to a skip for example, the field number may be out of sequence. Accordingly, the first test is to determine if the field number is "good" (in sequence, box 906). If so, the current field number is incremented (908) and the program continues to compute the "expected local groove number" (910). This involves storing the 6 bits of the DAXI field number that are greater (more significant) than the 3 LSB's (which identify the 8 disc sectors).

If the field number test (906) is "bad" then the "expected" number is incremented (912) the difference between the actual DAXI number and the expected number is computed (by subtraction, 914) to determine the magnitude and direction of the error. If, in fact no error is present (difference zero, 916) the program continues to compute the expected LGN (910), else the program causes the microprocessor to send kick pulses to transducer 708 to radially translate to the correct groove (918) and then continues on to 910 to compute the expected LGN number as mentioned. Then a test is performed to determine if the end of field has been reached (920, counting field lines). If so, then the program branches back to the "enter normal play" point and steps 904–920 are repeated. If it is not the end of a field, then the program enters a branch which operates on the LGN data from unit 740 to provide intra-field track error correction tests and to provide corrective action, if needed.

In this specific example of the invention part of the LGN branch test is actually implemented in hardware. The read LGN step (922) is provided by unit 740 and the computation (comparing) step (924) is provided by subtractor 746. The reading of the data on bus 742 and the subtraction could be performed internally in processor 730 if desired. If the subtraction of the groove number from bus 742 from what is expected (from the DAXI code) is zero (926) then the program assumes that no tracking error has occurred and branches back to the end of field test (920). If not zero, a test is performed (928) to determine if the same error has occurred three times in a row. If not, there is a branch back to the end of field test 920. If so, a test is performed (930) to determine if the last two readings were equal. If not there is a branch back to the end of field test. If so, the program enters a kick routine 932 to radially translate the signal recovery transducer 708 to the groove number indicated by unit 740.

What is claimed is:

1. A method for forming a video disc recording signal for faclitating intra-field track error correction upon subsequent playback of video disc records recorded with said disc recording signal comprising the steps of:

(a) providing first and second baseband sound signals, a baseband video signal and a data sequence representative of field numbers of said video signal;
(b) providing a subset of said data sequence representative of track identification numbers;
(c) encoding said subset of said data sequence on first and second frequency shift keyed carrier waves;
(d) combining said first baseband sound signal with said first carrier wave to form a first resultant signal and combining said second baseband sound signal with said second carrier wave to form a second resultant signal;
(e) applying said baseband video signal and said resultant signals to respective frequency modulators; and
(f) summing the output signals produced by said frequency modulators to provide said video disc recording signal.

2. A video disc player for use with video disc records recorded with a signal manifestation including a video signal, a first data sequence representative of video field numbers and a second data sequence representative of a subset of said field numbers corresponding to track identification numbers, and conveying tracking information repeatedly within each field of said video signal, said subset being conveyed via first and second auto carriers, each audio carrier being representative of a sum of a baseband sound component and a modulated data component, comprising:

(a) recovery means for recovering said first data sequence from said recorded signal manifestation;
(b) first FM demodulator means for recovering a first one of said modulated data components from said first audio carrier;
(c) first detector means for demodulating said first data component to provide a first data signal;
(d) second FM demodulator means for recovering a second one of said modulated data components from said second audio carrier;
(e) second detector means for demodulating said second data component to provide a second data signal;
(f) data register means for storing said first and second data signals to provide said subset of said field number;
(g) data processing means for comparing said subset of said field numbers with said first data sequence to develop a tracking error control signal; and
(h) means for applying said tracking error control signal to said recovery means in a sense to reduce tracking errors occurring within a field of said video signal.

3. A video disc player as recited in claim 2 wherein said data processing means comprises microprocessor means programmed to provide at least one test of the validity of said subset of said field numbers prior to producing said tracking error control signal so as to prevent erroneous radial translation of said recovery means in the event of invalidity of said subset of said field numbers.

* * * * *